US008749915B2

(12) United States Patent
Sugi et al.

(10) Patent No.: US 8,749,915 B2
(45) Date of Patent: Jun. 10, 2014

(54) MOTOR UNIT INCLUDING CIRCUIT BOARD ARRANGED ON A BASE PORTION AND DISK DRIVE APPARATUS

(75) Inventors: Takatoki Sugi, Kyoto (JP); Tomohiro Yoneda, Kyoto (JP); Hiroshi Kobayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 142 days.

(21) Appl. No.: 13/290,209

(22) Filed: Nov. 7, 2011

(65) Prior Publication Data

US 2012/0113546 A1 May 10, 2012

(30) Foreign Application Priority Data

Nov. 8, 2010 (JP) ................................. 2010-249400

(51) Int. Cl.
*G11B 17/02* (2006.01)
*G11B 33/12* (2006.01)
(52) U.S. Cl.
USPC .................... 360/98.07; 360/99.08; 310/71
(58) Field of Classification Search
USPC ........... 360/98.07, 99.08, 9.08; 310/67 R, 71; 361/679.33
See application file for complete search history.

(56) References Cited

U.S. PATENT DOCUMENTS

| 5,214,331 | A | * | 5/1993 | Nishimura et al. ............. 310/71 |
| 5,548,458 | A | * | 8/1996 | Pelstring et al. ........... 360/99.08 |
| 5,572,381 | A | | 11/1996 | Stewart |
| 5,572,384 | A | * | 11/1996 | Kumagai et al. ........... 360/99.08 |
| 5,610,462 | A | * | 3/1997 | Takahashi ....................... 310/90 |
| 6,118,198 | A | | 9/2000 | Hollenbeck et al. |
| 6,204,996 | B1 | * | 3/2001 | MacLeod .................... 360/99.08 |
| 6,242,830 | B1 | * | 6/2001 | Katagiri ........................... 310/90 |
| 6,316,853 | B1 | * | 11/2001 | MacLeod .................... 310/67 R |
| 6,380,651 | B1 | * | 4/2002 | Yamaguchi et al. ............ 310/90 |
| 6,543,379 | B2 | * | 4/2003 | Schwartz ....................... 116/234 |
| 6,652,324 | B2 | | 11/2003 | Maiers et al. |
| 6,661,131 | B2 | * | 12/2003 | Fukutani ......................... 310/51 |
| 6,771,460 | B2 | | 8/2004 | Nii et al. |
| 7,012,191 | B1 | | 3/2006 | Watanabe et al. |
| 7,023,116 | B2 | * | 4/2006 | Kuribara ......................... 310/90 |

(Continued)

FOREIGN PATENT DOCUMENTS

JP 07-075275 A 3/1995
JP 07-107693 A 4/1995

(Continued)

OTHER PUBLICATIONS

Yawata et al., "Spindle Motor and Storage Disk Drive Apparatus", U.S. Appl. No. 13/352,442, filed Jan. 18, 2012.

(Continued)

*Primary Examiner* — Jefferson Evans
(74) *Attorney, Agent, or Firm* — Keating & Bennett, LLP

(57) ABSTRACT

A motor unit for use in a disk drive apparatus includes a motor portion, a housing member including a through hole defined therein, and a circuit board. The motor portion includes a rotating portion, a base portion, and a stator fixed to the base portion. The circuit board is arranged to extend from an outside of the motor portion to an inside of the stator through a gap defined between the stator and the base portion. The circuit board includes a connection portion arranged radially inward of the stator. A plurality of lead wires of the stator is connected to the connection portion.

24 Claims, 9 Drawing Sheets

(56) References Cited

U.S. PATENT DOCUMENTS

| | | | |
|---|---|---|---|
| 7,105,963 B2 | 9/2006 | Ito et al. | |
| 7,144,275 B2 | 12/2006 | Iida | |
| 7,187,518 B2 * | 3/2007 | Hong et al. | 360/99.08 |
| 7,254,882 B2 | 8/2007 | Ito et al. | |
| 7,684,146 B1 | 3/2010 | Andrikowich et al. | |
| 7,757,378 B1 | 7/2010 | Mann et al. | |
| 8,089,721 B1 * | 1/2012 | Andrikowich et al. | 360/99.22 |
| 8,120,217 B2 | 2/2012 | Yawata et al. | |
| 8,120,872 B2 | 2/2012 | Sekii et al. | |
| 8,164,851 B2 | 4/2012 | Yoneda et al. | |
| 8,324,767 B2 * | 12/2012 | Lee | 310/67 R |
| 8,400,729 B1 * | 3/2013 | Watanabe | 360/99.08 |
| 2005/0206255 A1 | 9/2005 | Yoshino et al. | |
| 2006/0023339 A1 | 2/2006 | Fukuyama et al. | |
| 2006/0279876 A1 * | 12/2006 | Albrecht et al. | 360/99.08 |
| 2006/0281229 A1 | 12/2006 | Koh et al. | |
| 2009/0154008 A1 * | 6/2009 | Tamaoka et al. | 360/99.08 |
| 2009/0316299 A1 | 12/2009 | Tashiro et al. | |
| 2013/0050872 A1 * | 2/2013 | Sekii et al. | 360/99.08 |

FOREIGN PATENT DOCUMENTS

| | | |
|---|---|---|
| JP | 07-222386 A | 8/1995 |
| JP | 07-334967 A | 12/1995 |
| JP | 11-218128 A | 8/1999 |
| JP | 2000-209804 A | 7/2000 |
| JP | 2000-306319 A | 11/2000 |
| JP | 2001-067775 A | 3/2001 |
| JP | 2005-057892 A | 3/2005 |
| JP | 2005-210787 A | 8/2005 |
| JP | 2006-040423 A | 2/2006 |
| JP | 2006-100252 A | 4/2006 |
| JP | 2006-185553 A | 7/2006 |
| JP | 2006-187145 A | 7/2006 |
| JP | 2009-110611 A | 5/2009 |
| JP | 2009-189157 A | 8/2009 |
| JP | 2010-009644 A | 1/2010 |
| JP | 2011-114892 A | 6/2011 |

OTHER PUBLICATIONS

Yawata et al., "Spindle Motor and Storage Disk Drive Apparatus", U.S. Appl. No. 13/352,445, filed Jan. 18, 2012.

Sugi et al., "Spidle Motor, Disk Drive Apparatus, and Method of Manufacturing Spindle Motor", U.S. Appl. No. 13/241,773, filed Sep. 23, 2011.

Saichi et al., "Spindle Motor Having Connecting Mechanism Connecting Lead Wire and Circuit Board, and Storage Disk Drive Having the Same", U.S. Appl. No. 13/029,143, filed Feb. 17, 2011.

Sugi et al., "Spindle Motor, and Disk Drive Apparatus Including the Spindle Motor", U.S. Appl. No. 13/334,620, filed Dec. 22, 2011.

Matsuyama et al., "Spindle Motor, Disk Drive Apparatus, and Method of Manufacturing Spindle Motor", U.S. Appl. No. 13/424,632, filed Mar. 20, 2012.

Watanabe, "Method of Manufacturing Motor, Motor, and Disk Drive Apparatus", U.S. Appl. No. 13/437,103, filed Apr. 2, 2012.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Yawata et al., "Spindle Motor and Storage Disk Drive Apparatus", U.S. Appl. No. 12/849,868, filed Aug. 4, 2010.

Yawata, "Spindle Motor, Disk Drive Apparatus, and Method of Manufacturing Spindle Motor", U.S. Appl. No. 13/365,286, filed Feb. 3, 2012.

* cited by examiner

US 8,749,915 B2

MOTOR UNIT INCLUDING CIRCUIT BOARD ARRANGED ON A BASE PORTION AND DISK DRIVE APPARATUS

BACKGROUND OF THE INVENTION

1. Field of the Invention

The present invention relates to a motor unit, and more specifically to a motor unit for use in a disk drive apparatus.

2. Description of the Related Art

Disk drive apparatuses, such as hard disk drives, typically have spindle motors (hereinafter referred to simply as "motors") arranged to rotate disks installed therein. For example, in a disk drive apparatus disclosed in JP-A 7-334967, a bracket of a motor is fixed to a base of the disk drive apparatus through screws or the like. An inner bottom surface of the base includes a guide groove defined therein. The guide groove is arranged to extend from a collar portion of the bracket to a connector arranged in a side portion of the disk drive apparatus. A flexible printed circuit (FPC) board arranged to connect coil wires of a stator of the motor to the connector is attached to the guide groove.

JP-A 2006-40423 discloses a technique of filling an interior of a disk drive with a low-density gas, such as helium or hydrogen, to reduce vibrations of a disk and a head and to thereby enable highly precise recording of data.

As is described in JP-A 2006-40423, when the interior of the disk drive is filled with a gas that tends to diffuse more easily than air, such as a helium gas, it is necessary to ensure sufficient airtightness of a base of the disk drive.

Regarding the disk drive disclosed in JP-A 7-334967, in the case where lead wires, i.e., portions of the coil wires, are connected to the FPC board in the vicinity of the motor, it is necessary to prevent a point of connection between each lead wire and the FPC board from coming into contact with a rotating portion of the motor. Moreover, in the case where a point of connection between the lead wire and the FPC board includes solder and is located right under the stator, it is necessary to space the connection point downwardly away from the stator. This arrangement leads to a reduction in the wall thickness of a housing of the disk drive.

When the lead wires are connected to the FPC board at positions away from the motor, the lead wires are arranged under a disk, a head, or the rotating portion of the motor, and thus it is therefore necessary to prevent the lead wires from coming into contact with the disk, the head, or the rotating portion. The same holds true with the case where the lead wires are directly connected to the connector.

SUMMARY OF THE INVENTION

A motor unit according to a first preferred embodiment of the present invention preferably includes a motor portion, a housing member, and a circuit board. The housing member includes a through hole arranged to permit an external connection defined therein at a position away from the motor portion. The circuit board preferably is arranged on an upper surface of the housing member to extend from the motor portion toward the through hole.

The motor portion includes a rotating portion preferably including an annular rotor magnet, a base portion, and a stator. The stator includes a plurality of lead wires, and is fixed to the base portion radially inside the rotor magnet.

The circuit board is preferably arranged to extend from an outside of the motor portion to an inside of the stator through a first gap defined between the stator and the base portion. The circuit board includes a connection portion arranged radially inward of the stator.

The plurality of lead wires are connected to the connection portion.

A motor unit according to a second preferred embodiment of the present invention preferably includes a motor portion including a rotating portion, a base portion, and a stator; a housing member; and a fixing member.

The rotating portion includes an annular rotor magnet. The stator includes a plurality of lead wires, and is fixed to the base portion radially inside the rotor magnet. The housing member is arranged to define a portion of a housing of the disk drive apparatus.

The fixing member is arranged on an upper surface of the housing member to fix the plurality of lead wires in an area overlapping with the motor portion or in an area overlapping with a disk to be attached to the motor portion.

The preferred embodiments of the present invention make it possible to prevent each lead wire and a portion at which the circuit board and each lead wire are connected to each other from interfering with any other component of the disk drive apparatus.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Figure 1:
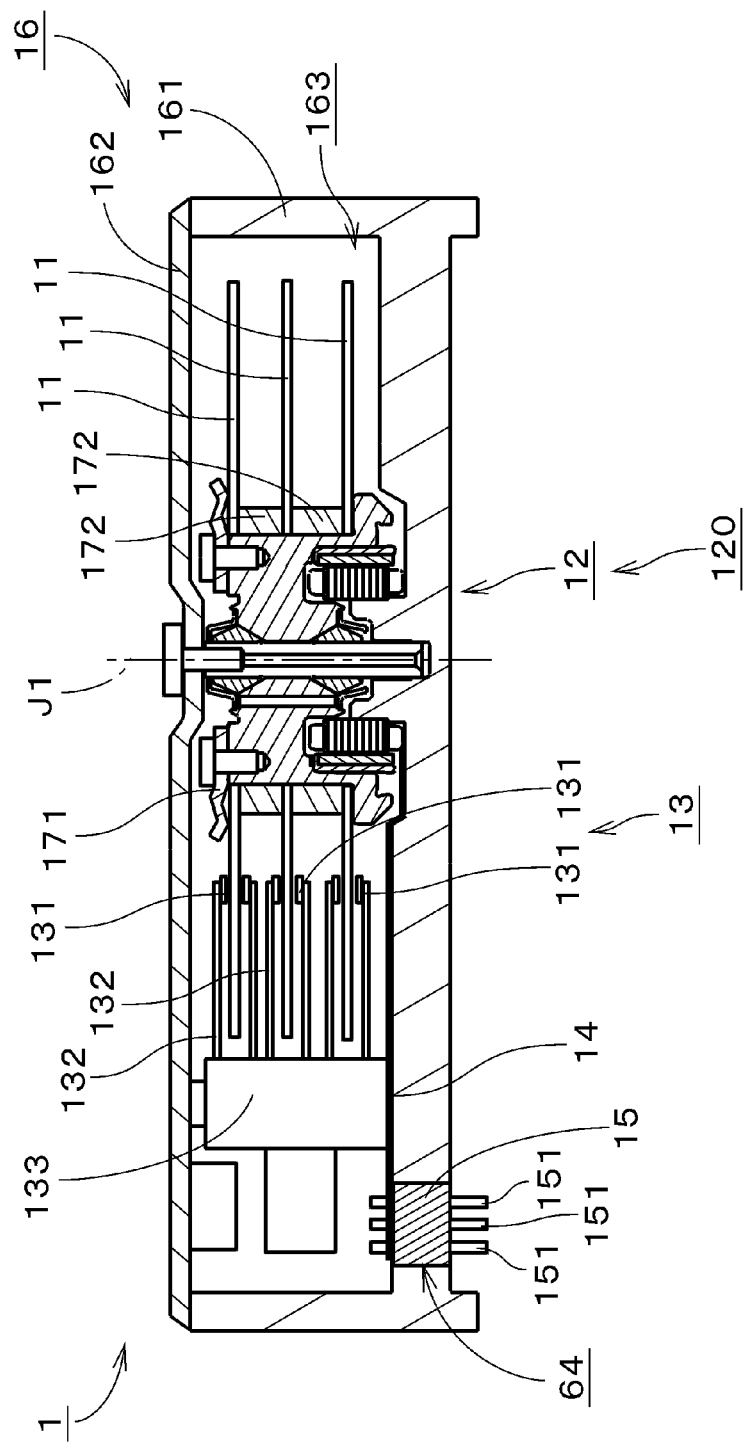
FIG. 1 is a diagram illustrating a disk drive apparatus according to a first preferred embodiment of the present invention.

In the following description, a vertical direction is defined as a direction in which a central axis of a motor portion extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor portion is actually installed in a device. Also note that directions parallel to or substantially parallel to the central axis are referred to by the term "axial direction", "axial", or "axially", that directions radiating from the central axis are simply referred to by the term "radial direction", "radial", or "radially", and that a circumferential direction about the central axis is simply referred to by the term "circumferential direction", "circumferential", or "circumferentially".

FIG. 1 is a cross-sectional view of a disk drive apparatus 1 including a spindle motor (hereinafter referred to as a "motor portion") 12 according to a first preferred embodiment of the present invention. The disk drive apparatus 1 preferably is a so-called hard disk drive. The disk drive apparatus 1 preferably includes, for example, three disks 11 in which information is to be stored, the motor portion 12, an access portion 13, a circuit board 14, a connector 15, and a housing 16. Each of the disks 11 is attached to the motor portion 12. The access portion 13 is arranged to read and/or write information from or to each of the disks 11. Note that the number of disks 11 is not limited to three, but could be any desirable number of disks 11.

The housing 16 preferably includes a cup-shaped first housing member 161 and a flat plate-shaped second housing member 162. The housing 16 is arranged to accommodate the disks 11, the motor portion 12, the access portion 13, the circuit board 14, and the connector 15. The second housing member 162 is joined to the first housing member 161 preferably by a welding process, for example, to define the housing 16 of the disk drive apparatus 1. An interior space 163 of the housing 16 is preferably hermetically enclosed, and is arranged to contain either no, or an extremely small amount of dirt or dust. An interior of the housing 16 is preferably filled with a low-density gas, such as, for example, helium. Hereinafter, the motor portion 12, the first housing member 161, and the circuit board 14 will be referred to collectively as a "motor unit 120".

The three disks 11 are arranged axially at regular intervals through spacers 172, and clamped to the motor portion 12 through a clamper 171. The access portion 13 preferably includes, for example, six heads 131, six arms 132, and a head actuator mechanism 133. Each of the arms 132 is arranged to support a separate one of the heads 131. Each head 131 is arranged in close proximity to a corresponding one of the disks 11 to magnetically read and/or write information from or to the disk 11. The head actuator mechanism 133 is arranged to actuate each arm 132 to move an associated one of the heads 131 relative to a corresponding one of the disks 11. The above-described arrangement enables the head 131 to access a desired location on the disk 11 while being arranged in close proximity to the rotating disk 11 to read and/or write information therefrom or thereto.

Figure 2:
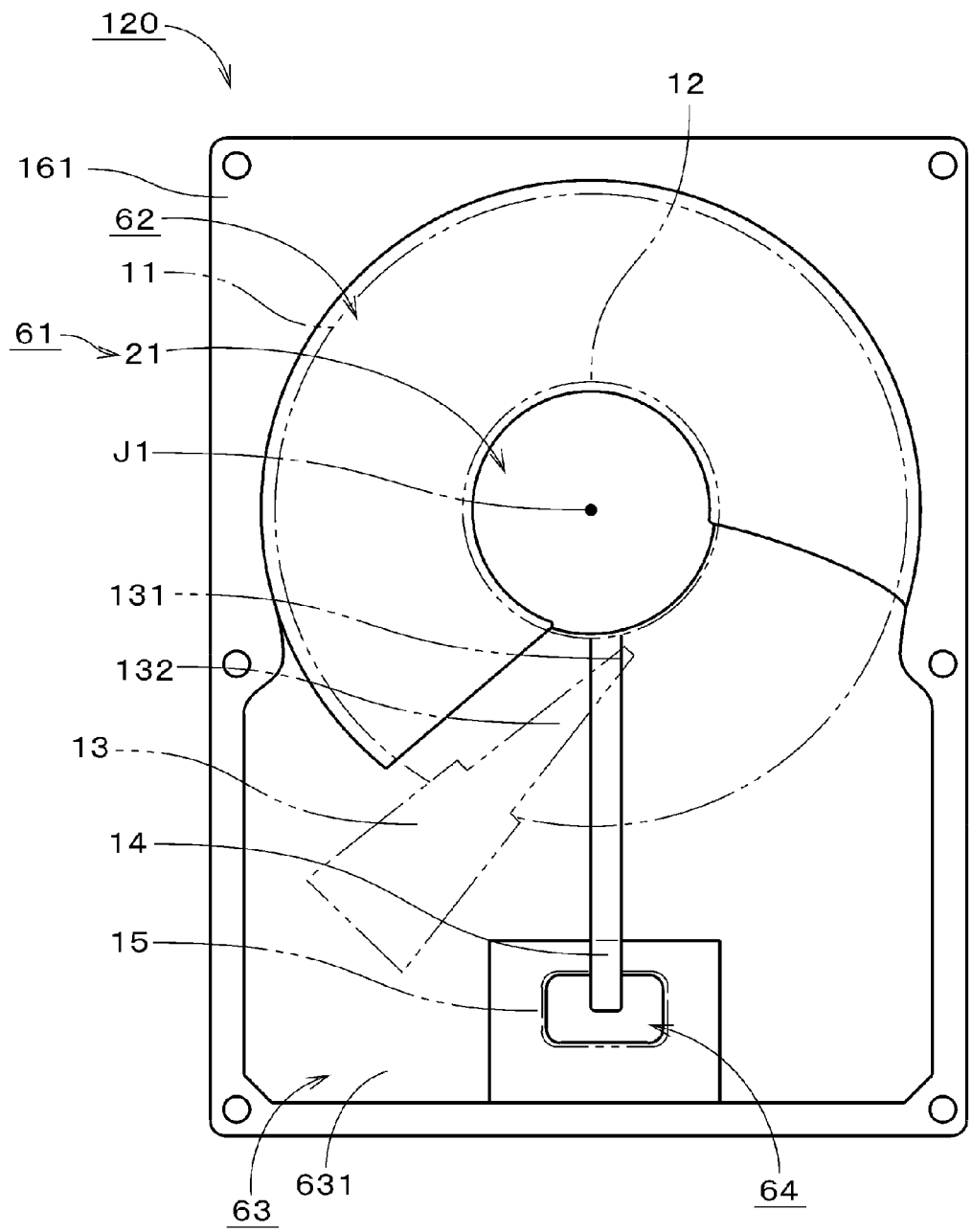
FIG. 2 is a plan view of a motor unit according to the first preferred embodiment of the present invention.

FIG. 2 is a plan view of the motor unit 120. In FIG. 2, the motor portion 12, the disks 11, which are to be attached to the motor portion 12, and the access portion 13 and the connector 15, which are to be attached to the first housing member 161, are represented by chain double-dashed lines. Moreover, a portion of the circuit board 14 which is hidden behind the motor portion 12 is not shown.

An upper surface 61 of a bottom portion of the first housing member 161, that is, a surface thereof which faces the interior space 163, includes a base portion 21, to which the motor portion 12 is attached, a disk-accommodating recessed portion 62, an access portion-accommodating recessed portion 63, and a through hole 64 defined therein. In the following description, the base portion 21 is regarded as being a portion of the motor portion 12. The disk-accommodating recessed portion 62 preferably includes a portion substantially having the shape of the letter "C" that is centered on a central axis J1 and arranged to accommodate large portions of the disks 11.

The access portion 13 is attached to the access portion-accommodating recessed portion 63. The range of movement of each arm 132 of the access portion 13 overlaps with the access portion-accommodating recessed portion 63. A bottom surface 631 of the access portion-accommodating recessed portion 63 is preferably arranged at a level axially lower than that of a bottom surface of the disk-accommodating recessed portion 62. A portion of each disk 11 is preferably arranged over the access portion-accommodating recessed portion 63. By providing the access portion-accommodating recessed portion 63 in the disk drive apparatus 1, it is possible to prevent each head 131 from coming into contact with the upper surface 61 of the first housing member 161 while the motor portion 12 is driven.

The upper surface 61 includes a portion slightly recessed relative to the access portion-accommodating recessed portion 63 arranged at a position away from the motor portion 12, and the through hole 64 is defined in this portion. Referring to FIGS. 1 and 2, the connector 15 is attached to the through hole 64 preferably through, for example, an adhesive or the like. The first housing member 161 of the disk drive apparatus 1 includes only one through hole defined therein. The through hole 64 is hermetically sealed with the connector 15 to prevent a leakage of the helium through the through hole 64.

One preferable example of the circuit board 14 is a flexible printed circuit board. Referring to FIG. 2, the circuit board 14 is arranged on the upper surface 61 of the first housing member 161. In addition, the circuit board 14 is arranged to extend from the motor portion 12 toward the through hole 64 while crossing the bottom surface 631 of the access portion-accommodating recessed portion 63. The circuit board 14 is preferably secured to the upper surface 61 throughout its entire length while being arranged to extend in accordance with changes in elevation of the upper surface 61. Preferably, the circuit board 14 is attached to the upper surface 61 through, for example, an adhesive. The circuit board 14 is drawn out of the motor portion 12 at a position where each head 131 approaches closest to the motor portion 12, i.e., a position where the access portion-accommodating recessed portion 63 and the motor portion 12 overlap with each other or are in close proximity to each other. A large portion of the circuit board 14 is thereby arranged inside the access portion-accommodating recessed portion 63.

Referring to FIG. 1, the connector 15 preferably includes a plurality of pins 151. An end portion of each pin 151 which is arranged inside the housing 16 is connected to the circuit board 14, while an opposite end portion of the pin 151, which is arranged to project downward from the housing 16, is connected to, for example, an external power supply, so that power can be supplied from the external power supply to the motor portion 12. Note that supply of electricity to other members, such as the access portion 13, and control of such other members are also carried out through the connector 15.

Figure 3:
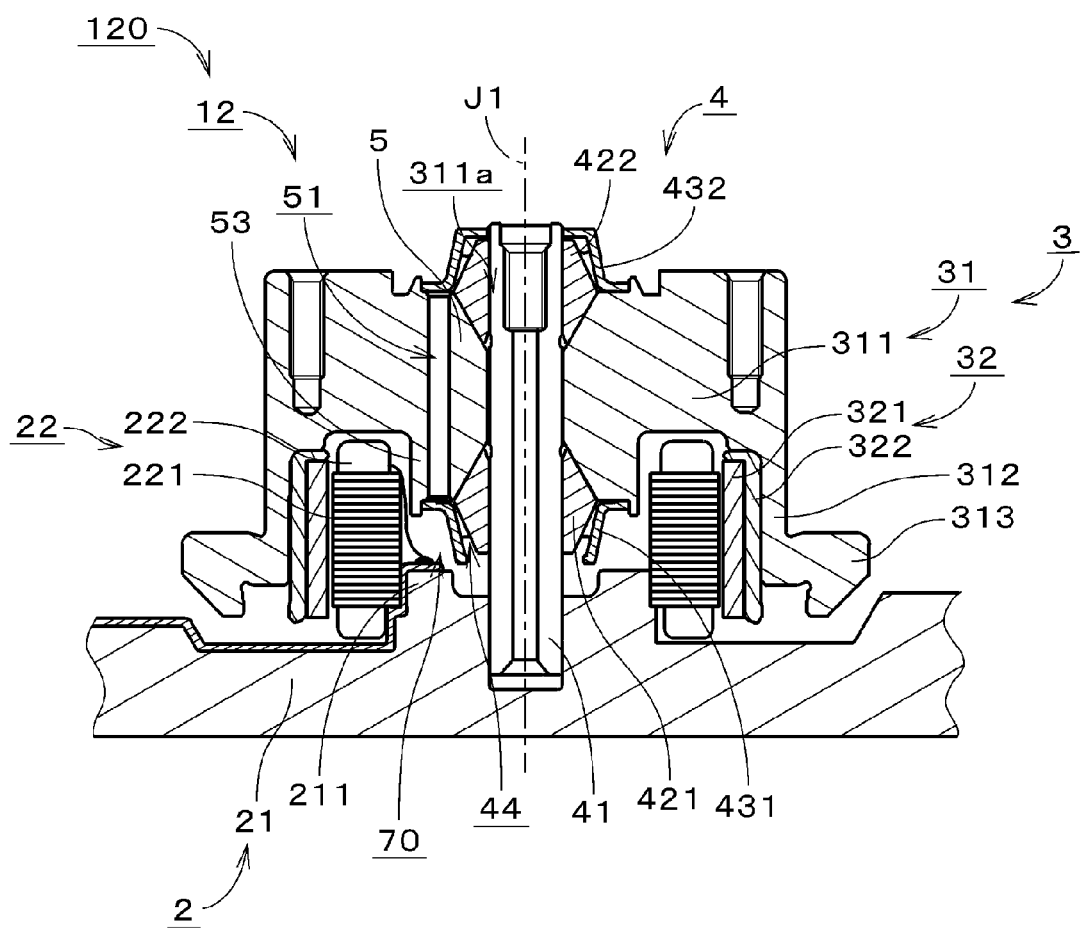
FIG. 3 is a cross-sectional view of the motor unit.

FIG. 3 is a cross-sectional view of the motor unit 120. A preferable example of the motor portion 12 is preferably an outer-rotor motor. The motor portion 12 preferably includes a stationary portion 2, a rotating portion 3, and a fluid dynamic bearing mechanism 4 (hereinafter referred to as a "bearing mechanism 4"). The bearing mechanism 4 is attached to the stationary portion 2. The rotating portion 3 is supported through the bearing mechanism 4 to be rotatable about the central axis J1 of the motor portion 12 with respect to the stationary portion 2.

The stationary portion 2 preferably includes the base portion 21 and an annular stator 22. The stator 22 is arranged around a cylindrical holder 211 of the base portion 21. The stator 22 preferably includes a stator core 221 and coils 222, each of which is wound on the stator core 221.

The rotating portion 3 includes a rotor hub 31 and a magnetic member 32. The rotor hub 31 preferably includes a hub body 311, a cylindrical portion 312, and a disk mount portion 313. The cylindrical portion 312 is arranged to project downward from an outer edge portion of the hub body 311. The disk mount portion 313 is arranged to extend radially outward from a bottom portion of the cylindrical portion 312. The magnetic member 32 preferably includes a rotor magnet 321 and a back iron 322. The rotor magnet 321 is preferably substantially annular in shape and centered on the central axis J1. The rotor magnet 321 is arranged radially inward of the cylindrical portion 312 with the back iron 322 intervening therebetween. The motor portion 12 is arranged to produce a torque between the rotor magnet 321 and the stator 22, which is arranged radially inward of the rotor magnet 321.

The hub body 311 includes a hole portion 311a extending in an axial direction defined in a center thereof. Hereinafter, a portion 5 of the hub body 311 which includes the hole portion 311a and which is located in the vicinity of the central axis J1 will be referred to as a "sleeve portion 5". The sleeve portion 5 preferably includes a communicating hole 51 extending in the axial direction from an upper surface to a lower surface thereof defined therein near the hole portion 311a. The sleeve portion 5 further includes a lower projecting portion 53 arranged to project axially downward. The lower projecting portion 53 is arranged radially inward of the stator 22. In addition, the lower projecting portion 53 is spaced away from the holder 211 in the vertical direction.

The bearing mechanism 4 preferably includes a shaft 41, a first cone portion 421, a second cone portion 422, a first cover member 431, a second cover member 432, and a lubricating oil 44. The shaft 41 is arranged in the hole portion 311a of the sleeve portion 5. In addition, the shaft 41 is arranged inside a recessed portion located inside the holder 211 to stand still and be oriented in the vertical direction along the central axis J1.

The first cone portion 421 is arranged on a lower side of the sleeve portion 5. The second cone portion 422 is arranged on an upper side of the sleeve portion 5. The first cover member 431 is arranged on a bottom portion of the sleeve portion 5 to cover a lower portion of an outside surface of the first cone portion 421. In the motor portion 12, the first cover member 431, the lower projecting portion 53, the stator core 221, and the holder 211 are arranged to together define a space 70. The second cover member 432 is arranged on a top portion of the sleeve portion 5 to cover an upper end and an upper portion of an outside surface of the second cone portion 422.

Figure 4:
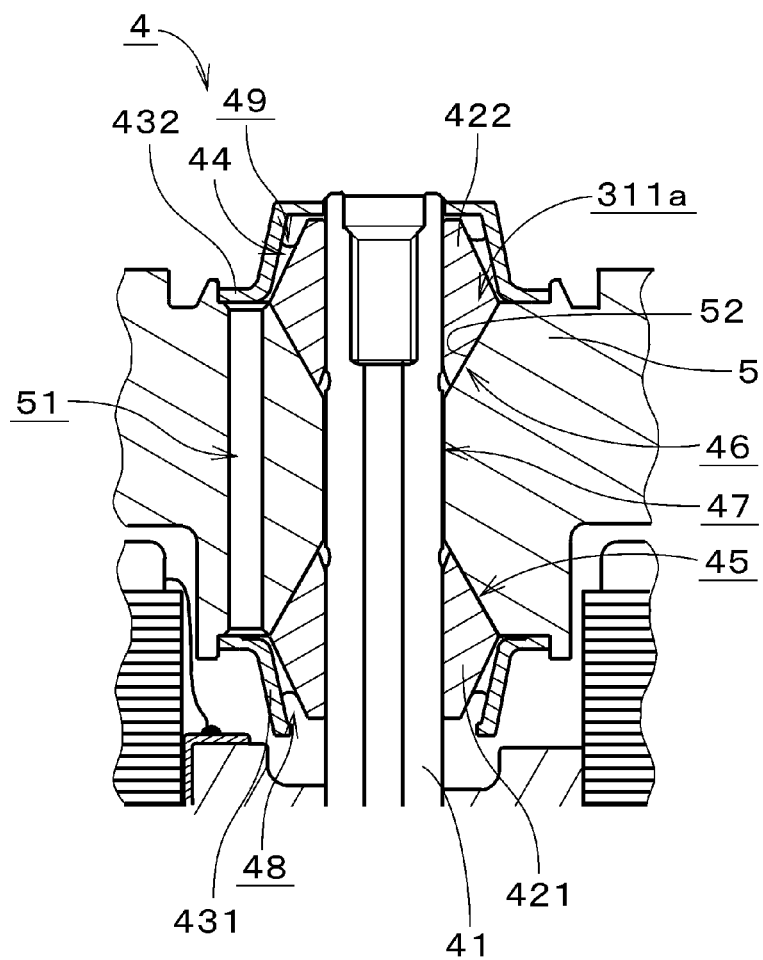
FIG. 4 is a diagram illustrating a bearing mechanism according to the first preferred embodiment of the present invention in an enlarged form.

FIG. 4 is a diagram illustrating the bearing mechanism 4 in an enlarged form. A lower portion of an inside surface 52 of the hole portion 311a of the sleeve portion 5 is arranged to be angled radially outward with decreasing height, while an upper portion of the inside surface 52 is arranged to be angled radially outward with increasing height.

A first inclined gap 45, which is arranged to be angled radially outward with decreasing height, is defined between the lower portion of the inside surface 52 of the sleeve portion 5 and the first cone portion 421. A second inclined gap 46, which is arranged to be angled radially outward with increasing height, is defined between the upper portion of the inside surface 52 of the sleeve portion 5 and the second cone portion 422. The lubricating oil 44 is arranged to fill a gap 47, which is defined between the shaft 41 and a middle portion of the sleeve portion 5, the first inclined gap 45, the communicating hole 51, and the second inclined gap 46. In the bearing mechanism 4, surfaces of the lubricating oil 44 are located in a gap 48 defined between the first cover member 431 and the first cone portion 421, and a gap 49 defined between the second cover member 432 and the second cone portion 422.

While the motor portion 12 is driven, a fluid dynamic pressure is generated through the lubricating oil 44 in each of the first and second inclined gaps 45 and 46. The sleeve portion 5 is thereby supported to be rotatable with respect to the shaft 41. In the motor portion 12, the sleeve portion 5 is arranged to define a portion of the bearing mechanism 4 as a portion supported by the shaft 41.

Figure 5:
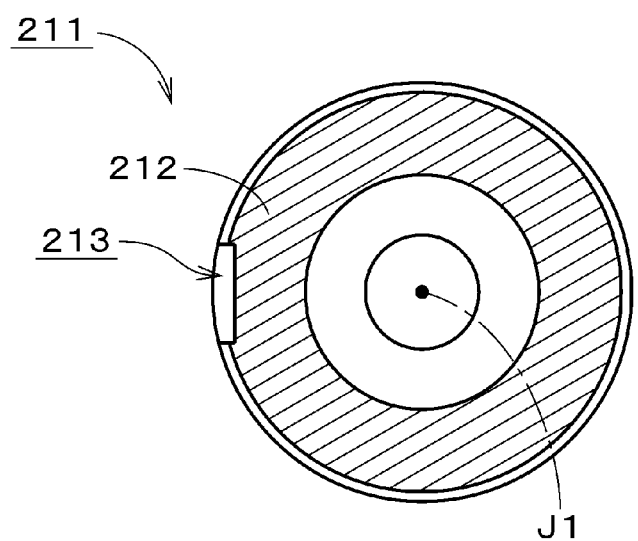
FIG. 5 is a plan view of a holder of a base portion according to the first preferred embodiment of the present invention.
Figure 6:
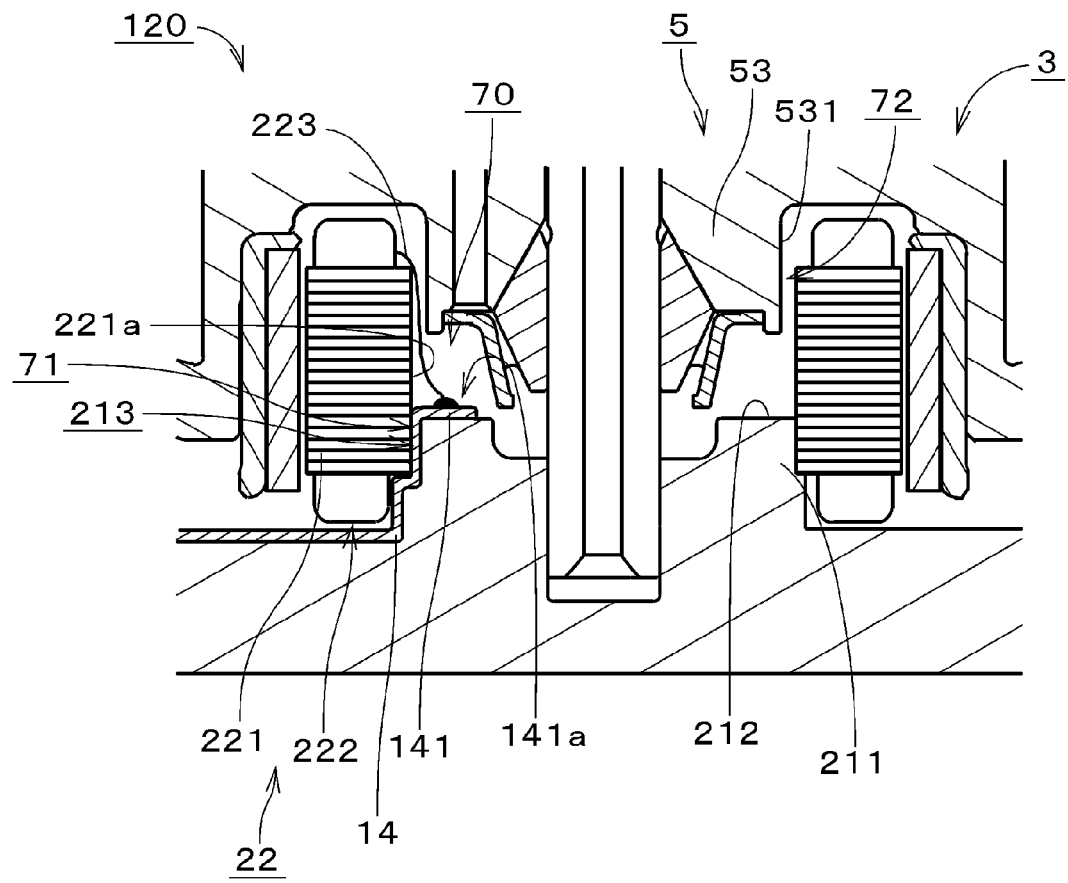
FIG. 6 is a cross-sectional view of the motor unit.

FIG. 5 is a plan view of the holder 211 of the base portion 21 illustrated in FIG. 3 and its vicinity. An upper surface 212 of the holder 211, which is indicated by parallel oblique lines, includes an annular surface perpendicular or substantially perpendicular to the central axis J1. In addition, an outside surface of the holder 211 preferably includes a cut portion 213 recessed slightly in a radially inward direction. FIG. 6 is a diagram illustrating the stator 22 of the motor unit 120 and its vicinity in an enlarged form. A first gap 71 extending in the vertical direction is defined between the cut portion 213 and an inside surface 221a of the stator core 221. The circuit board 14 is held between both side surfaces of the first gap 71. Moreover, a second gap 72 extending in the vertical direction is defined between the inside surface 221a of the stator core 221 and an outside surface 531 of the lower projecting portion 53 of the sleeve portion 5. The second gap 72 is continuous with the space 70. Note that the first gap 71 refers to a first gap defined between the stator and the base portion, more specifically to a first gap defined between an inner circumferential portion of the stator 22 and the outside surface of the holder 21.

Figure 7:
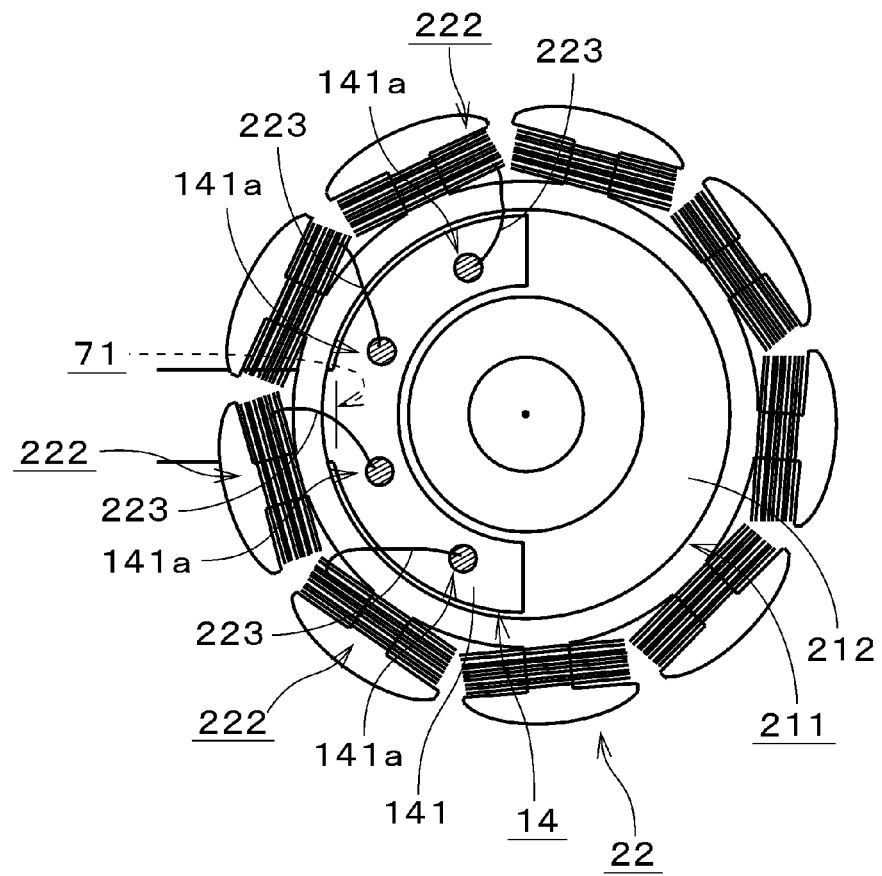
FIG. 7 is a diagram illustrating a stator, the holder, and a circuit board according to the first preferred embodiment of the present invention.

FIG. 7 is a diagram illustrating the holder 211, the stator 22, and the circuit board 14 illustrated in FIG. 6 as viewed from above. A connection portion 141, which is preferably arranged substantially in the shape of the letter is defined at an end portion of the circuit board 14. Referring to FIGS. 6 and 7, the circuit board 14 is arranged to extend from an outside of the motor portion 12 to an inside of the stator 22 through the first gap 71, which is defined between the stator 22 and the holder 211. The connection portion 141 is arranged radially inward of the stator 22 and on the upper surface 212 of the holder 211. The connection portion 141 is preferably attached to the upper surface 212.

A plurality of lead wires 223 leading from the coils 222 are arranged to extend from an upper side of the coils 222 downward through the second gap 72, which is defined between the stator 22 and the lower projecting portion 53 as illustrated in FIG. 6, to the space 70. In the space 70, the lead wires 223 are soldered to the connection portion 141. Hereinafter, a portion where each of the lead wires 223 is connected to the connection portion 141 will be referred to as a "solder portion 141a".

In the motor unit 120, presence of the space 70 above the holder 211 contributes to preventing each solder portion 141a from coming into contact with the rotating portion 3. Moreover, referring to FIG. 7, the arrangement of the connection portion 141 inside the stator 22 makes it possible to shorten the distance between adjacent ones of the solder portions 141a when compared to the case where the connection portion 141 is arranged outside the stator 22. This in turn makes it possible to reduce the size of the connection portion 141, leading to a reduction in production cost of the circuit board 14.

The structure of the motor unit 120 according to the first preferred embodiment has been described above. In a motor having a small height, a magnetic member and a disk mount portion are arranged in close proximity to a base portion. Therefore, a motor unit that includes a circuit board as with the motor unit 120 and which has a small height has a problem in which when making an attempt to connect lead wires to the circuit board under the magnetic member or the disk mount portion, there may be contact of a solder portion with the magnetic member or the disk mount portion. In the motor unit 120, however, the lead wires 223 leading from the coils 222 and the circuit board 14 are connected to each other radially inside the stator 22, and therefore, even if the motor portion 12 has a small height, it is easy to prevent an interference between each of the solder portions 141a and the rotating portion 3.

Meanwhile, if lead wires and a connection portion are to be connected to each other under a stator in a motor unit that includes a circuit board as with the motor unit 120, it is necessary to arrange a space to accommodate solder portions under the stator. In the motor unit 120, however, such a space is not necessary. Thus, interference between each of the solder portions 141a and the stator 22 is substantially prevented. Moreover, a sufficient thickness of the base portion 21 can be secured to prevent a shrinkage cavity or the like from being formed in the base portion 21. This contributes to ensuring sufficient airtightness of the interior space 163 of the housing 16 to improve reliability and durability of the disk drive apparatus 1. The sufficient thickness of the base portion 21 contributes to reducing an unwanted vibration characteristic of the base portion 21. The same holds true for other preferred embodiments of the present invention described below.

In the motor unit 120, an operation of connecting the lead wires 223 to the connection portion 141 can be easily accomplished because the connection portion 141 is arranged on the flat upper surface 212 of the holder 211. In the motor unit 120, the circuit board 14 is arranged to cross the bottom surface 631 of the access portion-accommodating recessed portion 63 to be connected to the connector 15, and a disturbed flow of, for example, helium between the disk 11 and the circuit board 14 is thereby prevented or reduced when compared with the case where the circuit board is arranged to cross the bottom surface of the disk-accommodating recessed portion, which is at a level higher than that of the bottom surface of the access portion-accommodating recessed portion, to be connected to the connector. This contributes to stable rotation of the disks 11. Furthermore, a sufficient distance is secured between the bottom surface 631 of the access portion-accommodating recessed portion 63 and each of the disks 11 and the heads 131 to prevent the circuit board 14 from coming into contact with any disk 11 or the access portion 13.

The first housing member 161 preferably includes only one through hole, i.e., the through hole 64 used for external connection, defined therein. Therefore, there is a lower probability of a leakage of the, for example, helium through a gap between any through hole and a component arranged inside the through hole than in the case of a housing member including a plurality of through holes defined therein. The same holds true for other preferred embodiments of the present invention described below.

Figure 8:
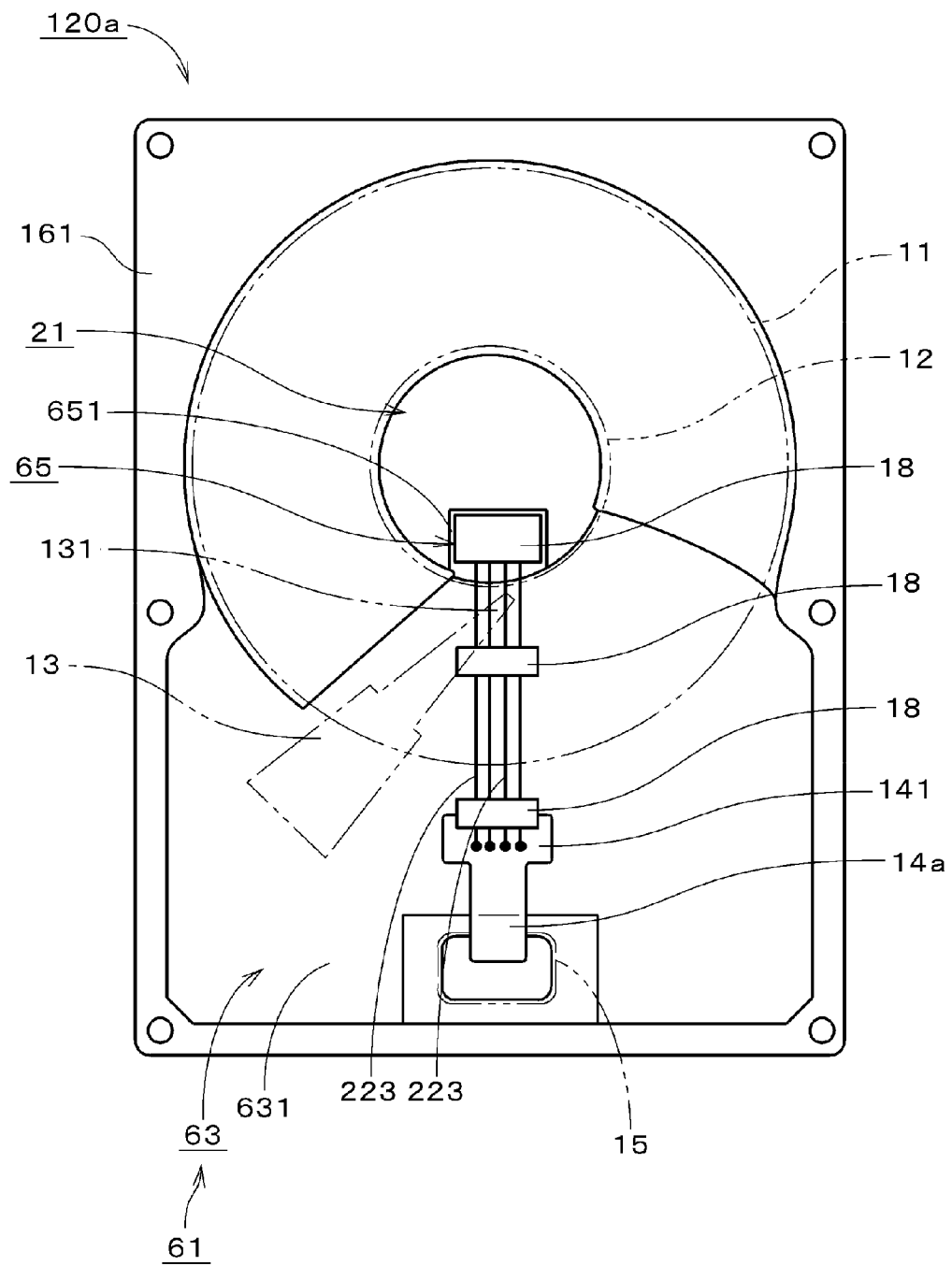
FIG. 8 is a plan view of a motor unit according to a second preferred embodiment of the present invention.

FIG. 8 is a diagram illustrating a motor unit 120a according to a second preferred embodiment of the present invention. In FIG. 8, the disks 11, the motor portion 12, the access portion 13, and the connector 15 are represented by chain double-dashed lines. An end portion of each of the lead wires 223 on a side closer to the motor portion 12 is also not shown as appropriate. The motor unit 120a includes a plurality of fixing members 18 used to fix the lead wires 223, and a circuit board 14a. The circuit board 14a has a smaller length than that of the circuit board 14 illustrated in FIG. 2. The base portion 21 of the motor portion 12 includes a second recessed portion 65 adjacent to the access portion-accommodating recessed portion 63 defined therein. The motor unit 120a is otherwise similar in structure to the motor unit 120 illustrated in FIG. 2. Accordingly, like members or portions are designated by like reference numerals.

The lead wires 223 of the motor portion 12 are arranged to extend through the second recessed portion 65 and the access portion-accommodating recessed portion 63 to be connected to the circuit board 14a. The lead wires 223 are drawn out of the motor portion 12 preferably at a position where each head 131 of the access portion 13 is closest to the motor portion 12, and this makes it possible to arrange each lead wire 223 inside the access portion-accommodating recessed portion 63 in its substantial entirety.

Figure 9:
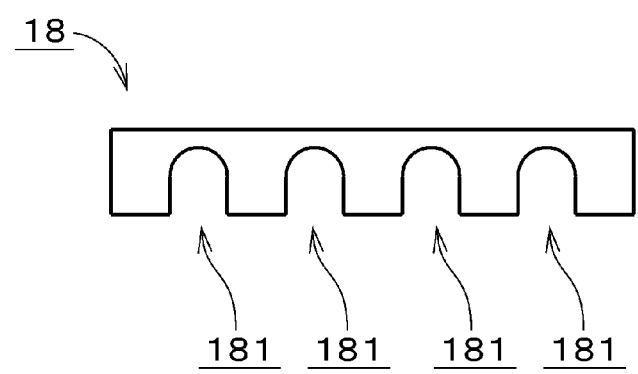
FIG. 9 is a front view of a fixing member according to the second preferred embodiment of the present invention.

FIG. 9 is a front view of each fixing member 18. The fixing member 18 is preferably made of, for example, a resin, and includes a plurality of groove portions 181 parallel or substantially parallel to each other. The fixing member 18 preferably has a thickness of about 1 mm, for example. Referring to FIG. 8, one of the fixing members 18 is arranged on a bottom surface 651 of the second recessed portion 65, while two of the fixing members 18 are arranged on the bottom surface 631 of the access portion-accommodating recessed portion 63, and more specifically in the vicinity of an area that overlaps with the connection portion 141 of the circuit board 14a, and in an area that overlaps with the disks 11, respectively. Each of the fixing members 18 is preferably fixed to the first housing member 161 through, for example, an adhesive or the like. An opening of each groove portion 181 illustrated in FIG. 9 is arranged to face the bottom surface 631 or 651 of the first housing member 161, and each of the lead wires 223 is arranged to pass through a separate one of the groove portions 181. In the motor unit 120a, both end portions and a middle portion of each lead wire 223 are held by the fixing members 18, and each lead wire 223 is thereby securely prevented from being lifted. Note that the circuit board 14a is arranged on a portion of the upper surface of the first housing member 161 which is radially outward of the area that overlaps with the disks 11.

In the motor unit 120a according to the second preferred embodiment, the lead wires 223 are held by the fixing members 18 on the bottom surfaces 631 and 651 of the access portion-accommodating recessed portion 63 and the second recessed portion 65, respectively, of the upper surface 61 of the first housing member 161. The bottom surfaces 631 and 651 of the access portion-accommodating recessed portion 63 and the second recessed portion 65, respectively, are arranged to overlap with the disks 11 and the motor portion 12, respectively. Each lead wire 223 is thereby substantially prevented from interfering with the rotating portion 3, the disks 11, and the access portion 13. Each lead wire 223 is drawn radially outward of the disks 11 to achieve a reduction in a total length of the circuit board 14a, and to thereby reduce a production cost of the circuit board 14a. The arrangement of the fixing members 18 inside the access portion-accommodating recessed portion 63 and the second recessed portion 65 contributes to preventing a contact of each of the fixing members 18 with the disks 11. A sufficient distance is secured between the bottom surface 631 of the access portion-accommodating recessed portion 63 and each of the disks 11 and the heads 131 to more effectively prevent each of the lead wires 223 from interfering with the disks 11 and the access portion 13. Note that each fixing member 18 may not necessarily be made of a resin, but may be made of a metal or the like, for example.

While preferred embodiments of the present invention have been described above, the present invention is not limited to the above-described preferred embodiments, but a variety of modifications are possible.

For example, the access portion-accommodating recessed portion 63 may be arranged to coincide only with the range of movement of each arm 132 of the access portion 13. Even in this case, it is possible to arrange large portions of the circuit board 14 and/or the lead wires 223 inside the access portion-accommodating recessed portion 63 by drawing the circuit board 14 or the lead wires 223 out of the motor portion 12 at the position where each head 131 approaches closest to the motor portion 12. Each of the circuit board 14 and the lead wires 223 is thereby prevented from interfering with the access portion 13 and the disks 11.

In modifications of each of the above-described preferred embodiments, each of the lead wires 223 may be connected to the connection portion 141 by methods other than soldering. Also, the number of lead wires 223 may not necessarily be four, but may be three or any number greater than three.

In modifications of the second preferred embodiment, each lead wire 223 may be directly connected to the connector 15. Also, the number of fixing members 18 is not limited to three and could be any other desirable number. Also, each lead wire 223 may be fixed to the upper surface 61 of the first housing member 161 by using, as the fixing members, adhesive tape, binding members for binding the lead wires 223 together, an adhesive, or the like.

In a modification of the first preferred embodiment, a groove arranged to guide the circuit board 14 to the connector 15 may be defined in the bottom surface 631 of the access portion-accommodating recessed portion 63. Similarly, in a modification of the second preferred embodiment, a groove arranged to guide the lead wires 223 to the connector 15 may be defined in the bottom surface 631. In a modification of the first preferred embodiment, the stator 22 may be arranged axially below the lower projecting portion 53 of the sleeve portion 5. This makes it easier to guide the lead wires 223 to the inside of the stator 22.

In each of the above-described preferred embodiments, the first housing member 161, which is arranged to define a portion of the housing 16, is continuous with the base portion 21 of the motor portion 12. Note, however, that the first housing member 161 and the base portion 21 may be defined by separate members in other preferred embodiments of the present invention. In this case, the base portion 21 is arranged in a hole portion defined in the first housing member 161. Also note that a motor that includes a sleeve portion fixed to the base portion, and a shaft arranged to rotate with respect to the sleeve portion may be used in each of the motor units 120 and 120a. Also note that hydrogen, instead of helium, may be used as the gas with which the interior of the housing 16 is filled. Also note that a mixture of helium and hydrogen gases, or a mixture of air and any one of helium, hydrogen, and the mixture of helium and hydrogen gases may be used as the gas with which the interior of the housing 16 is filled.

Preferred embodiments of the present invention are applicable to motor units for use in disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor unit for use in a disk drive apparatus, the motor unit comprising:
   a motor portion;
   a housing member arranged to define a portion of a housing of the disk drive apparatus, and including a through hole arranged to permit external connection therein at a position away from the motor portion; and
   a circuit board arranged on an upper surface of the housing member to extend from the motor portion toward the through hole; wherein
   the motor portion includes:
      a rotating portion including an annular rotor magnet centered on a central axis extending in a vertical direction;
      a base portion; and
      a stator including a plurality of lead wires, and fixed to the base portion radially inside the rotor magnet;
   the circuit board is arranged to extend from an outside of the motor portion to an inside of the stator through a first gap defined between the stator and the base portion, and includes a connection portion arranged radially inward of the stator such that the connection portion is closer to the central axis than every portion of the stator; and
   the plurality of lead wires are connected to the connection portion.

2. The motor unit according to claim 1, wherein the connection portion is arranged on an upper surface of the base portion and radially inward of the stator.

3. The motor unit according to claim 1, wherein
   the base portion includes a holder portion;
   the stator includes a stator core and coils wound on the stator core; and
   the first gap is defined between an inner circumferential portion of the stator and an outside surface of the holder portion.

4. The motor unit according to claim 1, wherein
   the base portion includes a holder portion;
   the stator includes a stator core and coils wound on the stator core;
   an outside surface of the holder portion includes a cut portion recessed radially inward; and
   the first gap is defined between an inside surface of the stator core and the cut portion.

5. The motor unit according to claim 4, wherein the circuit board is held between the inside surface of the stator core and side surfaces of the cut portion.

6. The motor unit according to claim 1, wherein
   the stator includes a stator core and coils wound on the stator core;
   an inside surface of the stator core and the rotating portion are arranged to have a second gap defined therebetween; and
   the plurality of lead wires are arranged to extend downward through the second gap to be connected to the connection portion.

7. The motor unit according to claim 1, wherein
   the base portion includes a holder portion;
   the holder portion and the rotating portion are axially spaced from each other by a space;
   the plurality of lead wires are soldered to the connection portion in the space.

8. The motor unit according to claim 7, wherein the connection portion is arranged on an upper surface of the holder portion and radially inward of the stator.

9. The motor unit according to claim 1, wherein
   the circuit board is a flexible printed circuit board; and
   the connection portion is attached to an upper surface of the base portion at a position radially inside of the stator.

10. The motor unit according to claim 1, wherein
    the upper surface of the housing member includes an access portion-accommodating recessed portion arranged to overlap with a range of movement of an arm of an access portion to be attached to the housing member; and the circuit board is arranged to cross a bottom surface of the access portion-accommodating recessed portion.

11. The motor unit according to claim 10, wherein the upper surface of the housing member includes a disk-accommodating recessed portion arranged to accommodate a large portion of a disk; and the bottom surface of the access portion-accommodating recessed portion is arranged at a level lower than that of a bottom surface of the disk-accommodating recessed portion.

12. The motor unit according to claim 10, wherein the circuit board is drawn out of the motor portion at a position where a head of the access portion approaches closest to the motor portion.

13. The motor unit according to claim 1, wherein the housing member includes only one through hole defined therein.

14. A disk drive apparatus comprising:

the motor unit of claim 1;

a disk attached to the motor portion of the motor unit;

an access portion arranged to read and/or write information from or to the disk; and another housing member arranged to define a housing arranged to accommodate the disk, the motor unit, and the access portion together with the housing member of the motor unit.

15. The disk drive apparatus according to claim 14, wherein an interior of the housing is filled with one of helium, hydrogen, a mixture of helium and hydrogen gases, and a mixture of an air and any one of helium, hydrogen, and the mixture of helium and hydrogen gases.

16. A motor unit for use in a disk drive apparatus, the motor unit comprising:

a motor portion including:

a rotating portion including an annular rotor magnet centered on a central axis extending in a vertical direction;

a base portion; and a stator including a plurality of lead wires, and fixed to the base portion radially inside the rotor magnet;

a housing member arranged to define a portion of a housing of the disk drive apparatus;

a fixing member arranged on an upper surface of the housing member to fix the plurality of lead wires in an area overlapping with the motor portion or in an area overlapping with a disk to be attached to the motor portion; and a circuit board arranged on the upper surface of the housing member and radially outward of the area overlapping with the disk; wherein upper surfaces of the plurality of lead wires are overlapped by the fixing member such that the plurality of lead wires are fixed by the fixing member.

17. The motor unit according to claim 16, wherein the fixing member is made of a resin, and includes a plurality of grooves arranged opposite to the upper surface of the housing member to have the plurality of lead wires passing therethrough.

18. The motor unit according to claim 16, wherein the upper surface of the housing member includes an access portion-accommodating recessed portion arranged to overlap with a range of movement of an arm of an access portion to be attached to the housing member; and the fixing member is arranged on a bottom surface of the access portion-accommodating recessed portion.

19. The motor unit according to claim 18, wherein the plurality of lead wires are arranged to cross the bottom surface of the access portion-accommodating recessed portion.

20. The motor unit according to claim 18, wherein the plurality of lead wires are drawn out of the motor portion at a position where a head of the access portion approaches closest to the motor portion.

21. The motor unit according to claim 16, wherein the upper surface of the housing member includes a recessed portion arranged to overlap with the motor portion; and the fixing member is arranged on a bottom surface of the recessed portion which is provided on the upper surface of the housing member.

22. The motor unit according to claim 16, wherein the housing member includes only one through hole defined therein.

23. A disk drive apparatus comprising:

the motor unit of claim 16;

a disk attached to the motor portion of the motor unit;

an access portion arranged to read and/or write information from or to the disk; and another housing member arranged to define a housing arranged to accommodate the disk, the motor unit, and the access portion together with the housing member of the motor unit.

24. The disk drive apparatus according to claim 23, wherein an interior of the housing is filled with one of helium, hydrogen, a mixture of helium and hydrogen gases, and a mixture of an air and any one of helium, hydrogen, and the mixture of helium and hydrogen gases.

* * * * *